Dec. 25, 1951 J. L. VINCENT 2,579,987
IMPROVED BALL MOUNT FOR FLUID METER VANES
Filed Dec. 8, 1947 2 SHEETS—SHEET 1

Joseph L. Vincent
INVENTOR.

BY *[signature]*
Attorneys

Dec. 25, 1951  J. L. VINCENT  2,579,987
IMPROVED BALL MOUNT FOR FLUID METER VANES
Filed Dec. 8, 1947  2 SHEETS—SHEET 2

Joseph L. Vincent
INVENTOR.

BY *Attorneys*

Patented Dec. 25, 1951

2,579,987

UNITED STATES PATENT OFFICE 2,579,987

IMPROVED BALL MOUNT FOR FLUID METER VANES

Joseph L. Vincent, Chicago, Ill.

Application December 8, 1947, Serial No. 790,427

3 Claims. (Cl. 121—69)

This invention relates generally to meters, and more particularly to a means and process of repairing and assembling a fluid meter, the means described being equally suitable for incorporation in meters during their original manufacture and the process of assembling being also adaptable to the assembling of new meters.

It is a primary object of this invention, therefore, to provide a means and method, as applied to water meters and the like, facilitating the accurate mounting of the ball within such meters, during repairing operations as well as during the assembly of new meters. With regard to repair of worn meters, it should be noted that the wear is usually confined largely to the seats for the ball and the ball itself, being of very hard material, ordinarily remains substantially spherical. Prior developed methods of repair of these meters have included a process of taking a two-piece ball apart and adding washers between the two hemispheres adjacent the vane of the meter and reassembling the meter, but this deformation of the ball while originally tightening the ball within the meter does not correct the seating of the ball in the seats provided therefor in the cages, and permanent repair is not effected. Another system of repair comprises the steps of adding washers to the ball as described above with subsequent grinding of the ball into the seats in the cages, this method is also ineffective because the ball is elongated and soon loosens due to the wobbling movement as the meter is used. A third method includes the steps of re-boring the seats in both parts of the cage, sweating a radius bushing in each re-bored aperture, and re-centrallizing the inserted bushing by the use of a lathe, and refinishing the ball. Still other methods have been developed but no method has heretofore been developed whereby a ball of proper spherical character is re-seated in the cages properly without such extensive machining operations as will entail a cost substantially equivalent to the cost of a new meter. The instant invention contemplates provision of inserts, insertable from the inner sides of the cages and adapted for quick and relatively inexpensive reconditioning of meters of this class.

Another object of this invention is to provide a meter construction in which the inserts and seats therefor are originally provided in the meter, repair and adjustment of the meter being thereby simplified.

Still another object of this invention is to provide a meter with a ball seat insert which is shiftable with reference to the corresponding cage, in order to facilitate proper centering of this insert and ball. As applied to the repair of meters, this structure has obvious advantages, and as applied to the construction of new meters, it should be noted that this construction overcomes difficulties now encountered by manufacturers of meters in securing perfect centering of the balls during original manufacture.

Still another object, of paramount importance, is the provision of ball seat inserts which are inserted from the inner sides of the cages, the inserts being then positively prevented from loosening away from the ball. In this connection it may be noted that inserts have been developed for application from the outsides of the cages with limited success in larger meters, although found to be unsatisfactory when applied to small meters. The wear in these meters is sometimes as high as sixty thousandths of an inch, and while the instant invention can be used to recondition meters in which the wear is great, since washers may be placed between a shoulder of the insert and the insert surface of the cage concerned, the same does not apply to the use of inserts applied from the outside of the cages, due to the fact that the latter type of insert must be removed, reground and refinished, the centralizing of this type of insert requiring the employment of skilled mechanics, whereas in the instant invention the centralizing of the insert is a very simple matter.

With these and other objects of a more specific nature definitely in view, this invention resides in certain novel features of construction, combination and arrangement of parts and portions and a procedure to be followed in repair and assembly of fluid meters which will be described hereinafter in the specification, particularly pointed out in the appended claims, and illustrated in the accompanying drawings which form a material part of this application, and in which:

Similar characters of reference designate similar or identical parts and portions throughout the specification and throughout the several views of the drawings.

Figure 1:
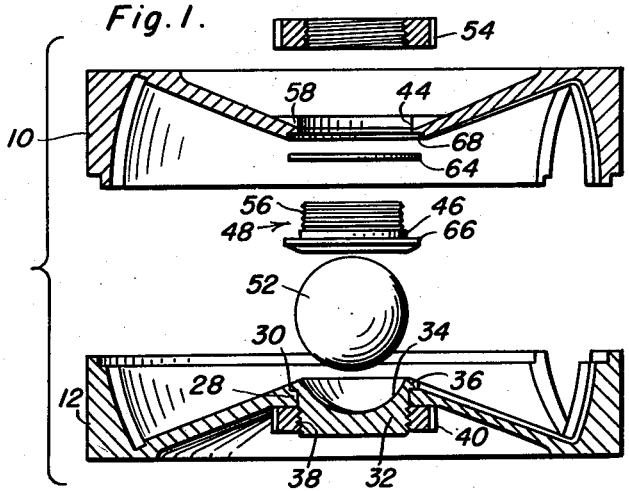
Figure 1 is a grouped view of the various parts of a water meter which are directly concerned with this invention, the view including representation of an insert centering ball which is slightly oversize, with reference to the standard ball used in the meter.

Referring now to the drawings in detail, it will be noted that this invention is adapted to be used with an environment including the conventional water meter or the like, having a pair of matching cages 10 and 12 which fit within a housing 14 having a cap member 16, an inlet 18 and an outlet 20. The meter will also include a ball 22 carrying a vane 24, as well as a division plate and a control roller, the latter parts being deleted from the figures as not directly concerned with this invention. In a conventional meter of this type, the ball 22 carries a mechanism operating pin 26 on the upper side thereof and this pin extends through an aperture in the central portion of the upper cage.

This invention envisions the refinement of the above described structure by substituting removable and adjustable ball seat inserts for the integral or fixed seats ordinarily provided in such meters. The lower cage 12 is provided with a central bore 28 and a shoulder 30 to receive an insert 32 which has a highly finished ball seat 34, a shoulder 36 adapted to rest upon the shoulder 30 of the cage 12 and an externally threaded portion 38 adapted to receive a locking nut 40. It should be carefully noted that when this invention is applied to some types of meters, the thickness of metal near the bore 28 may be so reduced that hard solder or other suitable metal must be added to strengthen this portion, as indicated at 42. The metal added at 42 will be machined flat on the outer surface in order to provide a seat for the locking nut 40.

Figure 3:
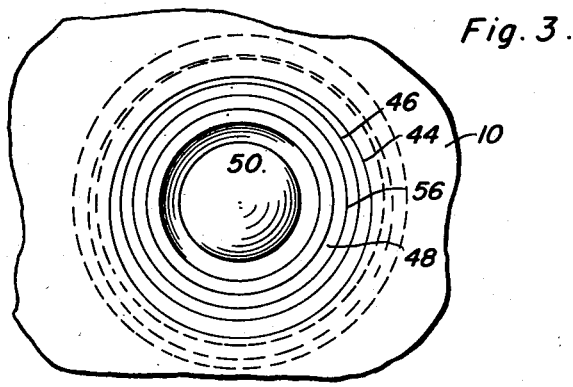
Figure 3 is a fragmentary top view of a central portion of the structure illustrated in Figure 2, the view being designed to illustrate how the insert may be shifted to allow for proper centering of the insert and ball.
Figure 4:
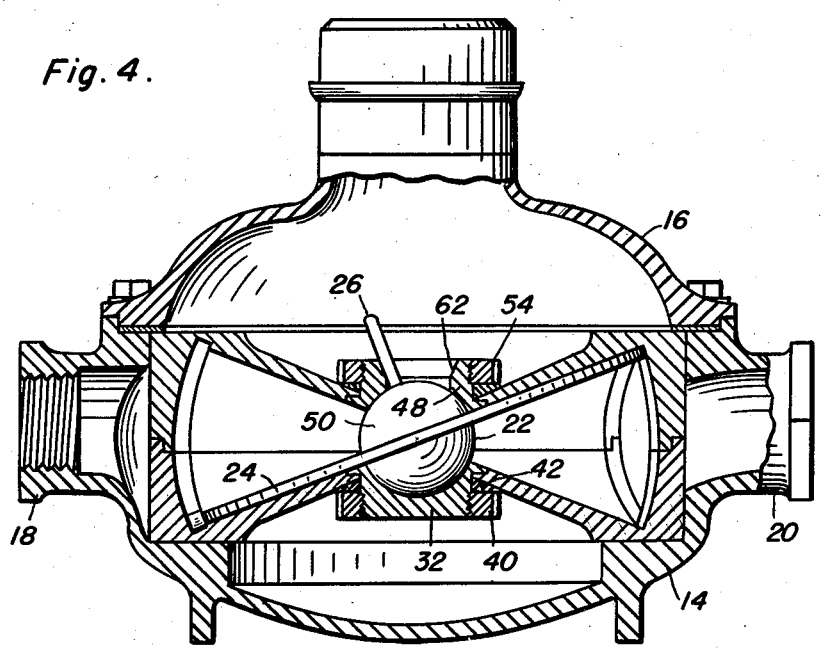
Figure 4 is a vertical cross sectional view of an assembled water meter, with parts thereof not directly concerned with this invention deleted from the figure and showing this invention incorporated therewith.
Figure 5:
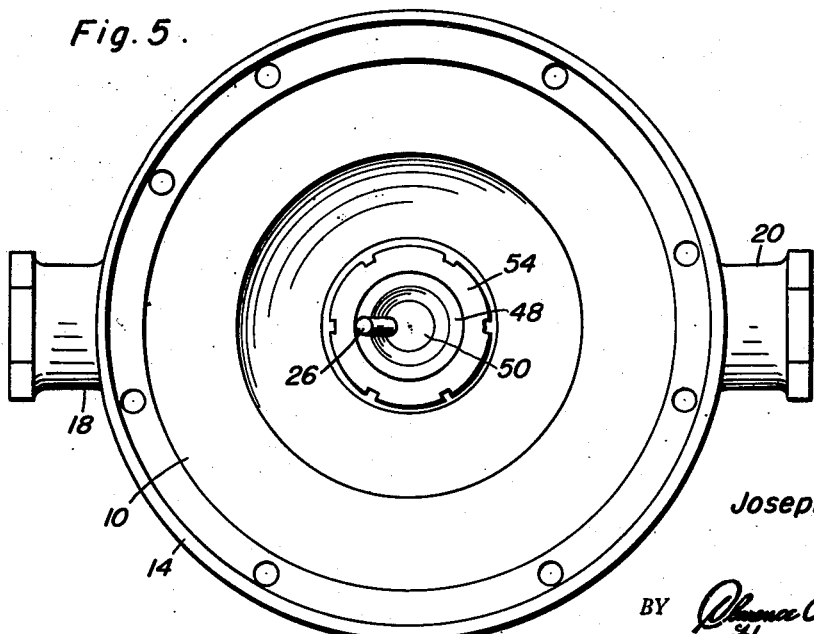
Figure 5 is a top plan view of the structure shown in Figure 4 with the cap removed.

While the insert 32 is made to fit snugly within the bore 28 in the lower cage, the bore 44 in the upper cage is oversized with reference to the corresponding portion 46 in the insert generally indicated by the numeral 48. This construction allows the insert 48 to be shifted slightly to facilitate the centering of the ball 50, as best illustrated in Figures 1 and 3. It should be very carefully noted that the ball 52 illustrated in Figure 1 is a steel setting ball which will be slightly oversized with reference to the ball 50, and that this ball 52 is used in the obvious manner including the setting of the ball 50 in the insert 32, holding the cage 10 firmly onto the cage 12 with the insert 48 loosely inserted in the bore 44 of the upper cage with slight shifting of the ball, facilitated by the addition of a pin on the ball 52 if desired, this pin being deleted from the drawing, and locking the insert 48 in place by tightening the nut 54 onto the threaded portion 56 of the insert, so as to clamp the insert in place. It should be noted that the top cage 10 will have extra metal 58 added to strengthen the portion adjacent the bore 44 and to form a seat for the nut 54.

The insert 48, of course, has a ball seat 60 and will be apertured, as at 62, to receive the mechanism actuating pin 26.

Figure 2:
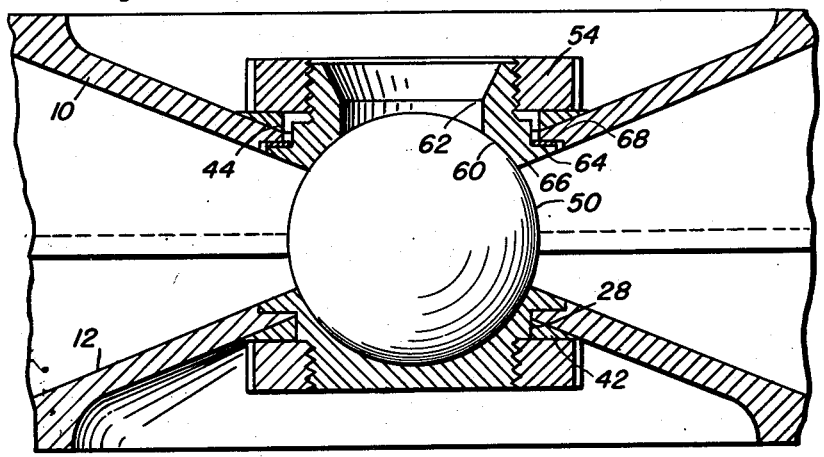
Figure 2 is an enlarged fragmentary view of the central portions of a water meter which has been repaired by the process described in the instant invention, including the insertion of washers or shims between the upper insert and the upper cage.

When this invention is incorporated originally with the fluid meter, the portions 42 and 58 will be integral with the cages, and the reconditioning of the meter will normally entail merely the insertion of a washer or shim, illustrated at 64 in Figure 1, in position between the shoulder 66 of the insert 48 and the shoulder 68 of the cage 10, as illustrated in Figure 2. The gauge of the washer or shim 64 will, of course, determine the amount of upsetting of the insert 48. The process will include the use of the setting ball 52 in the manner described above.

In repair of old meters, the bores 28 and 40, the shoulders 30 and 68, respectively, will first require to be formed in the cages. Inserts 32 and 48, with or without washer or shim members 64, are then inserted, the insert 48 being only loosely retained until such time as a setting ball 52 has been used to properly center this insert. Thereafter the meter is reassembled with the ball 50 and the vane 24 with the complementary parts of the meter. A very similar process may be used at the factory when this invention is incorporated with a new meter in order to first centralize the insert 48.

It will be understood from the foregoing description of the mechanical details and the operation of this invention, together with the above recitation of the objects sought to be achieved by this invention, that this novel construction may be used in several different ways, and this invention should be limited only by a proper interpretation of the terms used in the appended claims.

Having described the invention, what is claimed as new is:

1. In a water meter a pair of matching cages having aligned central apertures, ball seat inserts insertable into said apertures from the inner sides of said cages, one of said inserts being transversely adjustable with respect to the axis of the other insert to facilitate axial alignment of the inserts and locking means to hold the inserts rigidly in place.

2. In a water meter a pair of matching cages having aligned central apertures, ball seat inserts insertable into said apertures from the inner sides of said cages, one of said inserts being transversely adjustable with respect to the axis of the other insert to facilitate axial alignment of the inserts, and locking means to hold the inserts in place, said locking means comprising externally threaded projections on the inserts adapted to extend through said apertures, shoulders on said inserts adapted to engage the inner sides of said cages, and nuts on said projections and engaging the outer surfaces of said cages.

3. In a water meter a pair of matching cages having aligned central apertures, ball seat inserts insertable into said apertures from the inner sides of said cages, and locking means to hold the inserts in place, said locking means comprising externally threaded projections on the inserts adapted to extend through said apertures, shoulders on said inserts adapted to engage the inner sides of said cages, and nuts on said projections and engaging the outer surfaces of said cages, one of said apertures being enlarged so that the corresponding insert is transversely shiftable to facilitate centering thereof relative to the other insert.

JOSEPH L. VINCENT.

(References on following page)

REFERENCES CITED

The following references are of record in the file of this patent:

UNITED STATES PATENTS

| Number | Name | Date |
|---|---|---|
| 535,641 | Thomson | Mar. 12, 1895 |
| 568,641 | Thomson | Sept. 29, 1896 |
| 941,563 | Dilts | Nov. 30, 1909 |
| 1,179,759 | Reynolds | Apr. 18, 1916 |
| 1,556,451 | Mauck | Oct. 6, 1925 |
| 1,900,682 | Alcott | Mar. 7, 1933 |
| 2,215,134 | Rehnberg | Sept. 17, 1940 |
| 2,255,161 | Gray | Sept. 9, 1941 |
| 2,287,691 | Marchou | June 23, 1942 |
| 2,291,162 | Kirby | July 28, 1942 |
| 2,294,825 | Bassett | Sept. 1, 1942 |
| 2,391,405 | Fuglie | Dec. 25, 1945 |

FOREIGN PATENTS

| Number | Country | Date |
|---|---|---|
| 10,022 | Great Britain | of 1894 |
| 19,635 | Great Britain | of 1894 |
| 490,072 | Great Britain | Aug. 9, 1938 |